United States Patent [19]

Mauret et al.

[11] Patent Number: 5,688,310

[45] Date of Patent: Nov. 18, 1997

[54] CORROSION PROTECTION MATERIAL AND METHOD, AND USE THEREOF FOR ALUMINUMALLOYS

[76] Inventors: Pierre Mauret, 4 allée Roland Garros, 31520 Ramonville Saint Agne; Louis Gaches, 13 rue Montplaisir, 31400 Toulouse, both of France

[21] Appl. No.: 373,235
[22] PCT Filed: Jul. 2, 1993
[86] PCT No.: PCT/FR93/00685
  § 371 Date: Jan. 6, 1995
  § 102(e) Date: Jan. 6, 1995
[87] PCT Pub. No.: WO94/01501
  PCT Pub. Date: Jan. 20, 1994

[30] Foreign Application Priority Data

Jul. 6, 1992 [FR] France ................ 92 08419

[51] Int. Cl.⁶ .............. C23F 11/00; C23F 11/14
[52] U.S. Cl. .............. 106/14.42; 106/14.15; 106/14.34; 106/14.44; 106/14.05; 252/392; 534/682; 534/684; 534/722
[58] Field of Search ........ 106/14.15, 14.34, 106/14.42, 14.44, 14.05; 534/682, 684, 722; 252/392; 427/384

[56] References Cited

U.S. PATENT DOCUMENTS 3,706,698  12/1972  Buehler et al. ............... 523/207
4,110,073  8/1978   Mollet et al. ................. 8/549
4,527,994  7/1985   Lienhard et al. ............. 8/494

FOREIGN PATENT DOCUMENTS 2156922    6/1973   France.
2018689    11/1970  Germany.
59-0024312 2/1984   Japan.

OTHER PUBLICATIONS

Japanese Patents Gazette Week 8347, Issued Jan. 11, 1984.
Japanese Patents Report vol. 79, No. 01, Issued Feb. 2, 1979.
Corrosion Science vol. 22, No. 4, pp. 321–329 (19 Jun. 1981).

Primary Examiner—Anthony Green
Attorney, Agent, or Firm—Harold H. Dutton, Jr.

[57] ABSTRACT

A corrosion protection material and method for anon-metal alloys, particularly light aluminum alloys; the method comprises the steps of coating a material to be protected with a layer containing a chromium-free inhibitor, comprising at least one dihydroxyazoic salt having structural unit (a), wherein Y is a salt producing anion and M is a metal; for the same number of moles, protection with an effectiveness comparable to that of chromate inhibitors may thus be achieved;

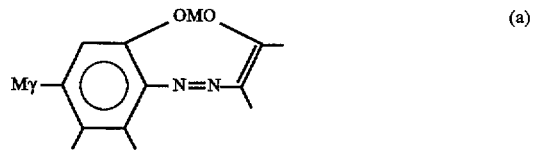

(a)

12 Claims, 2 Drawing Sheets

CORROSION PROTECTION MATERIAL AND METHOD, AND USE THEREOF FOR ALUMINUM ALLOYS

The invention concerns a method and a material for protecting a non-ferrous metallic material against corrosion, in particular a light aluminium alloy, for example an aluminium/magnesium alloy (type 5154), an aluminium/magnesium/copper alloy (type 2024) or an aluminium/magnesium/zinc alloy (type 7075).

BACKGROUND AND OBJECTS OF THE INVENTION

Non-ferrous metallic alloys, such as light aluminum alloys (notably alloys containing magnesium), are very much used in aeronautics and, increasingly, in other sectors, in particular in motor vehicle manufacture. The corrosion inhibiters currently used in aeronautics for this type of alloy are all based on strontium or zinc chromate, since these are the only ones that have sufficient efficacy of protection to comply with aeronautical standards (salt water tests). However, the chromate-based hexavalent compounds used are toxic and carcinogenic and are in the process of being prohibited in the majority of countries: because of this, there is currently a serious problem, which has not been resolved, in the protection of light alloys in the aeronautical industry. Moreover, it has been found that these chromate-based compounds are more or less rapidly destroyed in the presence of oxidisable products such as the glycols which are used as antifreeze liquids; thus these compounds are not very suitable for protecting internal parts (which are impossible to repaint) on which these oxidisable products may spread.

Other types of corrosion inhibiters have been proposed for light aluminium alloys, but these have very mediocre efficacy and cannot be used in the aeronautical industry because of the standards currently in force. The best products at present appear to be the following: a product based on modified aluminium triphosphate (trade name "K WHITE 84" manufactured by the TEIKOKU KAKO Co Ltd) products based on zinc phosphate (trade name "DELAPHOS 2" manufactured by "CHIMILAB ESSOR"; trade name "HEUCOPHOS ZPO" manufactured by "HEUBACH"; trade name "SICOR NOP" manufactured by "BASF"), and products based on barium and calcium phosphosilicate (trade name "HALOX BW 111" manufactured by "HALOX PIGMENTS") ; tests carried out for accelerated corrosion in a saline solution (the method described by P MAURET and P LACAZE, Corrosion Science, Vol 22, 4, 321, 1982) showed that these products provide full inhibition periods of around 1% to 10% compared with the inhibition periods provided by the chromate-based inhibiters.

In addition, the following publication should be noted: DATABASE WPI, Derwent Publications, London (GB) AN 79-07066B & JP-B-53047980 & JP-A-50076531 (HITACHI MAXELL), which describes the use, in a zinc battery, of a corrosion inhibitor mixed with the electrolyte; this inhibitor consists of an azonaphthalene comprising two nitrogen atoms, one carrying a hydroxyl group and/or a sulphonic group, the other a benzene nucleus.

DESCRIPTION OF THE INVENTION

The present invention sets out to provide a novel process for protecting non-ferrous metallic materials against corrosion, in particular light aluminium alloys.

The objective of the invention is to use a corrosion inhibiter totally free of chromium and having protection efficacy comparable to that of chromates (for an equal number of moles).

Another objective is to provide effective protection vis-a-vis oxidisable products such as glycols.

To this end, the process according to the invention for protecting a non-ferrous metallic material against corrosion consists of covering the said material with a coating containing at least one dihydroxyazoic salt with a solubility in water of between 0.01 g/l and 3 g/l, having the following structural unit:

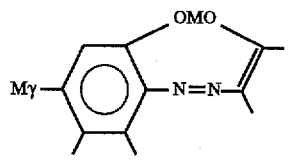

where γ is a salifiable anion and M a metal.

It has been found that protection for light aluminium alloys produced with such a dihydroxyazoic salt (totally chromium-free) has an efficacy comparable to that of chromate-based products, enabling aeronautical standards to be met. Preferably, a dihydroxyazoic salt is used in which the γ group is a sulphonate and the metal M is zinc, tin, strontium or an alkaline earth metal. Such dihydroxyazoic sulphonates have a solubility of between approximately 0.1 g/l and 1.5 g/l, which appears optimum.

According to one advantageous embodiment, a dihydroxyazoic salt is used which has the following chemical formula:

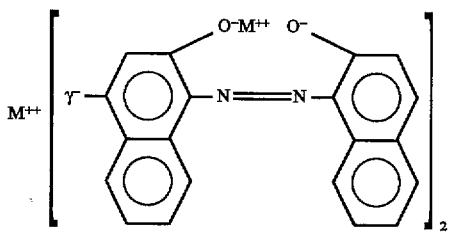

where γ is a salifiable anion, in particular sulphonate, and M a bivalent metal, in particular zinc.

As will be seen later, this product gives excellent results and can easily be obtained from products available on the market.

Preferably, the salt used has a mean particle size of less than 7 microns, in particular around 2 to 5 microns, and is mixed with a liquid binder suitable for the metallic material to be protected, with a view to being applied to the latter in the form of a primary protective coating; the binder, known per se, may in particular contain an insoluble mineral compound from the following group: zinc phosphate, zinc borate, talc or titanium oxide. The proportion by weight of the dihydroxyazoic salt with respect to the binder is advantageously between 5% and 25%.

The invention extends, as such, to a novel corrosion protection product containing, mixed with a binder, a corrosion inhibiter consisting of at least one dihydroxyazoic salt with a solubility in water of between 0.01 g/l and 3 g/l, having the following structural unit:

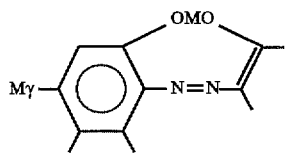

where γ is a salifiable anion, in particular sulphonate, and M a metal, in particular zinc. The dihydroxyazoic salt is in particular a complex salt of the following formula:

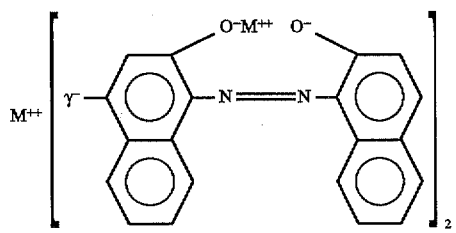

The corrosion inhibiter referred to may be manufactured using a soluble dihydroxyazoic salt available on the market, in particular a sodium salt, by effecting a substitution of the alkali metal and a complexing of the two hydroxyl groups situated at the ortho and ortho- positions in the azoic group.

It has been found that the product of the invention has increased efficacy when the dihydroxyazoic salt is associated with an insoluble mineral compound of appropriate particle size (preferably between 2 and 5 microns), in particular a phosphate, a silicate (talc) or an oxide (titanium oxide). It is possible to obtain this association during the manufacture of the dihydroxyazoic salt by mixing, in an aqueous medium, (a) a water-soluble dihydroxyazoic salt (in particular a sodium salt), (b) an insoluble mineral compound with a particle size of less than 7 microns, in particular a phosphate or silicate, and (c) a soluble salt of the metal M (chloride or other), with a view to precipitating the dihydroxyazoic salt of the metal M on the grains of the mineral compound, such as a phosphate, silicate or oxide. Filtration (or centrifugation or decantation) and washes followed by drying furnish the product ready to be mixed with the liquid binder. This product has increased protection efficacy compared with the dihydroxyazoic salt alone.

The invention can be applied in particular for protecting alloys in the following group: aluminium/magnesium (type 5154), aluminium/magnesium/copper (type 2024) and aluminium/magnesium/zinc (type 7075).

Figure 1:
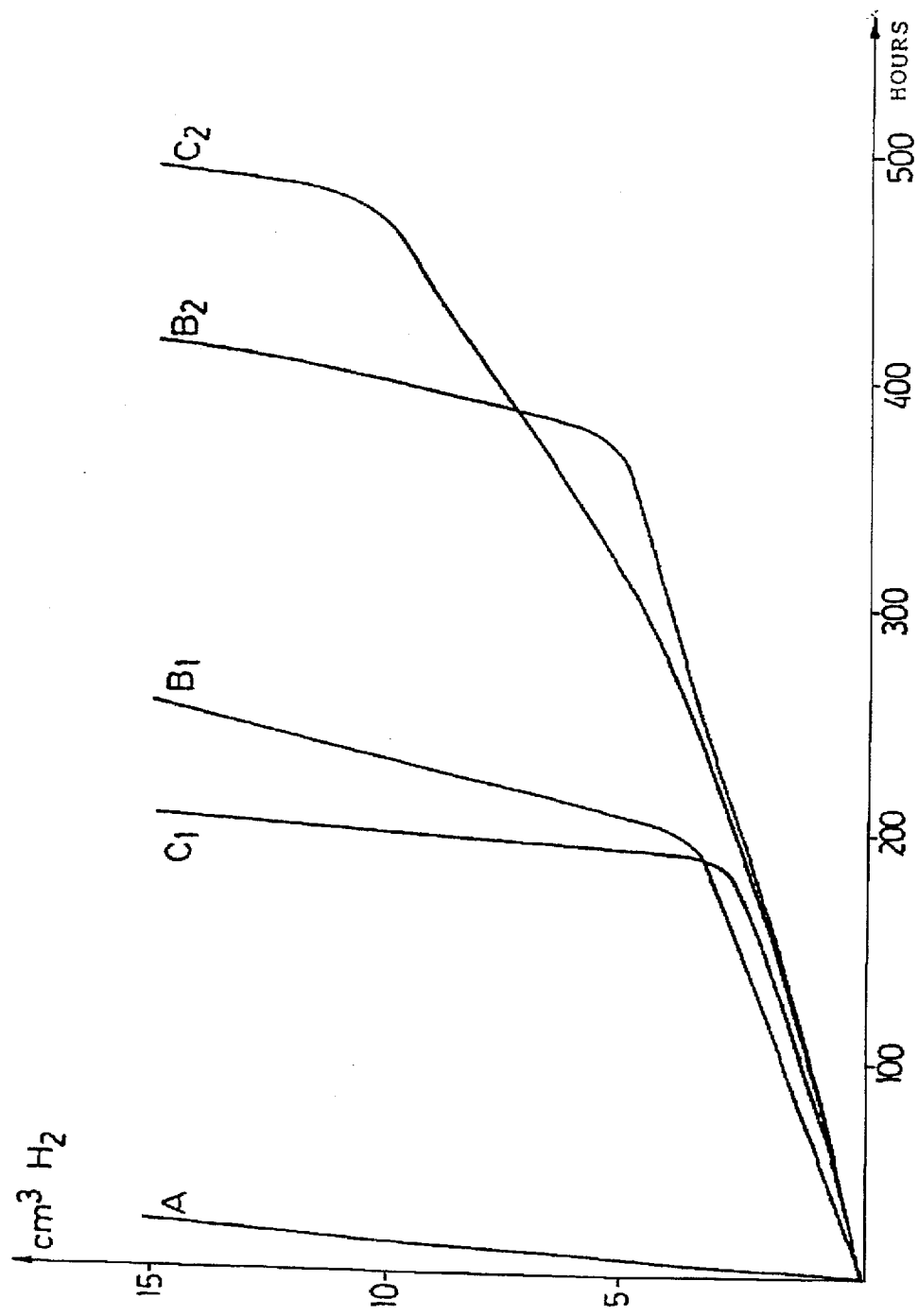
FIGS. 1 and 2 are comparative diagrams illustrating the results of the tests carried out in Example 2.

The following examples illustrate the manufacture of a protection product according to the invention, and the performance obtained in comparison with a chromate-based corrosion inhibiter.

DETAILED DESCRIPTION OF PREFERRED EMBODIMENTS

EXAMPLE 1

Example of the Preparation of a Protective Product Based On a Dihydroxyazoic Zinc Salt This manufacture is carried out using the following sodium sulphonate, available on the market:

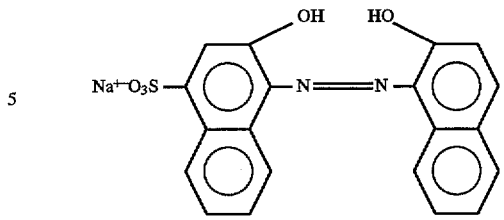

This soluble salt is hereinafter referred to as the starting salt.

250 g of the starting salt is dissolved in 2500 g of water at 90° C. The solution is stirred at this temperature for 1 hour in order to obtain good dissolution. 450 g of zinc phosphate is then added hot (90° C.) in the form of a powder with a mean particle size of approximately 4 microns. The mixture is stirred for 1 hour at the same temperature of 90° C.

The mixture is cooled to approximately 40° C. and then 200 g of an 80% (percentage by weight) aqueous solution of zinc chloride is slowly added thereto.

The mixture is then heated for 3 hours at 90° C. whilst stirring, and is left to decant for 48 hours. The solid phase is separated by eliminating the supernatant liquid. This solid phase is subjected to a series of eight successive washings with water; 2 to 3 liters of water are used in each washing, the solid phase being separated by centrifugation between two successive washings.

The absence of residual chloride is verified by a silver nitrate test and the absence of starting salt by a measurement of solubility.

The product is then dried by conventional methods (sand bed for 48 hours at between 60° C. and 80° C.).

The product obtained, analysed by conventional methods, consists of the following azoic salt:

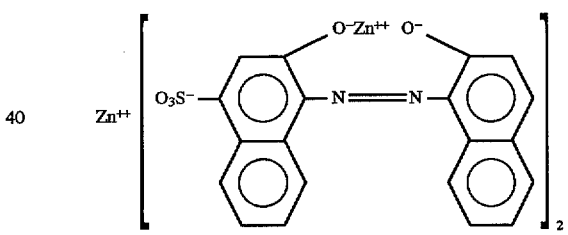

supported by the zinc phosphate grains with a particle size of around 4 microns; the content by weight of azoic salt is 25%. This product, constituting the corrosion inhibiter to which the invention relates, was subjected to the comparative tests described in Example 2.

In order to obtain the final protective product required to coat the light alloy structures in order to form a primary protective coating, the inhibiter manufactured above is dispersed in a binder in the same way as a conventional chromate inhibiter. The proportion by weight of inhibiter is in particular around 5% to 30%. The binders used may be the same as those used for the chromate inhibiters; they generally consist of organic solvents, polymers solubilised in these solvents and insoluble mineral fillers, particularly based on zinc phosphate, zinc borate, talc or titanium oxide.

EXAMPLE 2

Comparative Tests for Accelerated Corrosion in a Saline Medium

The inhibiter manufactured in Example 1 is compared with strontium chromate, which is, after zinc chromate, the most effective known corrosion inhibiter used in the aeronautical industry.

To make it possible to test the inhibiter itself (without interference with a binder), the tests were carried out in the absence of any binder.

The protocol for each test is as follows (as per the publication by P MAURET and P LACAZE already cited):

Into a sealed analysis flask, either 0.2 g of filings of light alloy 2024, or 4 small plates of the same alloy (dimensions: 0.5/8/35 mm), 10 cm³ of 3% aqueous solution of NaCl and the inhibiting compound are introduced. The curves in FIGS. 1 and 2 correspond to different quantities of inhibiter:

curves A and A': no inhibiter, curves $B_1$, $B'_1$ and $B_2$, $B'_2$: respectively 3.9 millimoles per liter and 7.8 millimoles per liter of the inhibiter of the invention, curves $C_1$, $C'_1$ and $C_2$, $C'_2$: respectively 4.9 millimoles per liter and 14.7 millimoles per liter of strontium chromate.

The flasks thus prepared are placed in an oscillating oven (oscillation frequency: 2 Hz) at 60° C. for 18-hour cycles. With the filings, the corrosion is accelerated by erosion, with the small plates, by erosion and abrasion. At the end of each cycle, the gases contained in the flasks are analysed by gas chromatography. The flasks are then opened in order to renew the atmosphere for the purpose of the following cycle. The volume of hydrogen released and the volume of oxygen absorbed during each cycle are deduced therefrom.

Figure 2:
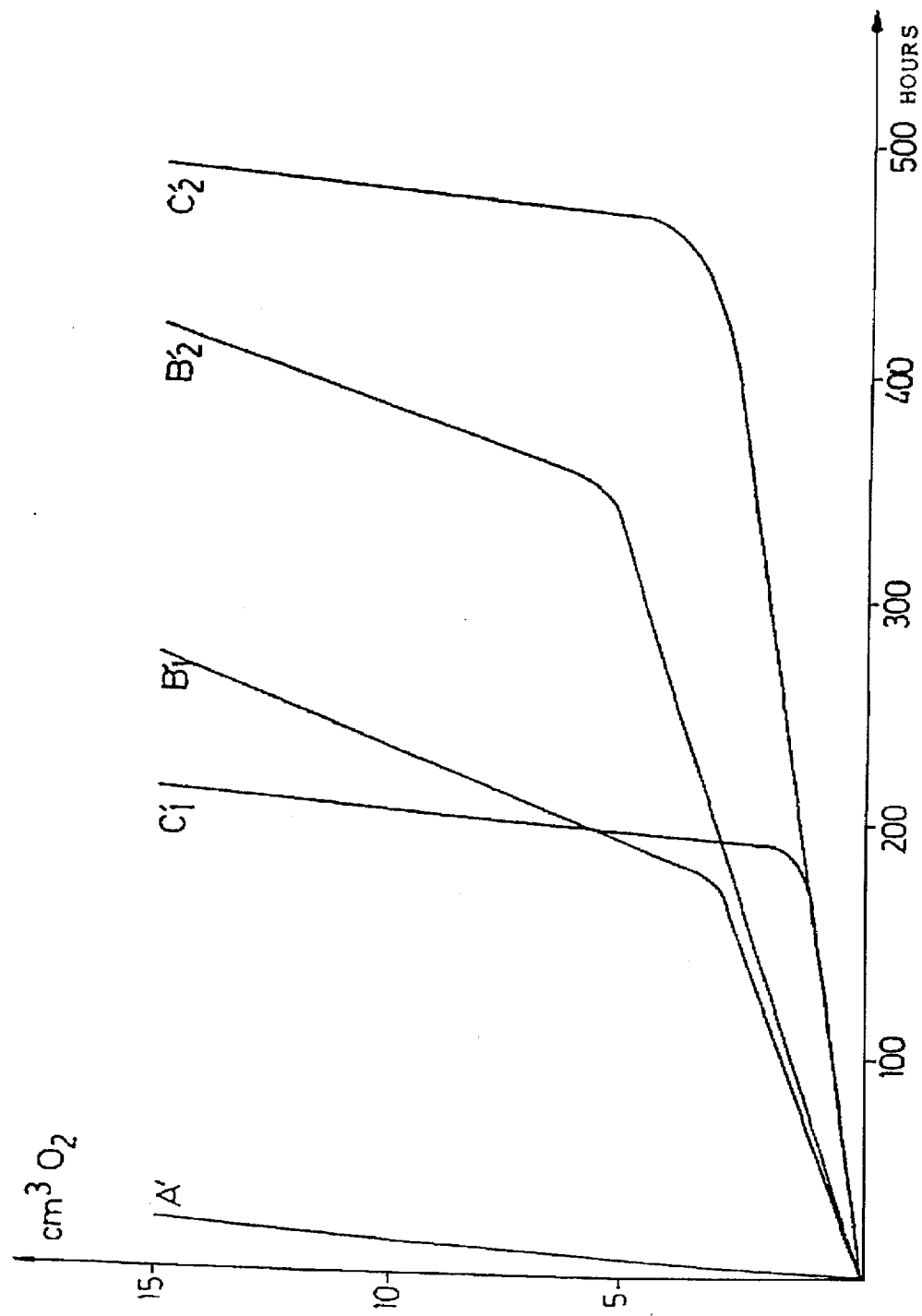

In FIG. 1, the curves giving the volumes of hydrogen released as a function of time are given, and in FIG. 2 the curves giving the volumes of oxygen absorbed as a function of time. These curves represent the progress of the corrosion, which takes place in accordance with the following cathodic reactions:

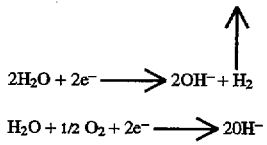

It can be seen that curves $B_1$ and $C_1$, like the curves $B'_1$ and $C'_1$, which correspond to similar molar concentrations of inhibiters (the inhibiter of the invention and the chromate inhibiter) are very similar: the efficacy of the inhibiter of the invention is similar to that of the chromate with an equal molar concentration.

EXAMPLE 3

Inhibiter Based on a Dihydroxyazoic Zinc Salt, Associated With a Smaller Proportion of Phosphate The manufacture of the inhibiter is identical to that of Example 1 but, in the mixture, only 125 g of zinc phosphate is added (instead of 450 g).

The inhibiter obtained includes the same azoic salt but with a content by weight of 50% compared with the total inhibiter+phosphate weight.

Comparative tests similar to those of Example 2 gave comparable results. The presence of the phosphate is in particular useful in that it makes it possible to adjust the particle size of the product; it also appears to improve the inhibiting efficacy of the product, but its proportion is not critical.

EXAMPLE 4

Inhibiter Based on a Dihydroxyazoic Strontium Salt

The manufacture of this inhibiter is carried out with the same starting salt as in Example 1, using an identical protocol, the zinc chloride being replaced by strontium chloride in the same proportions.

The inhibiter obtained consists of the following salt:

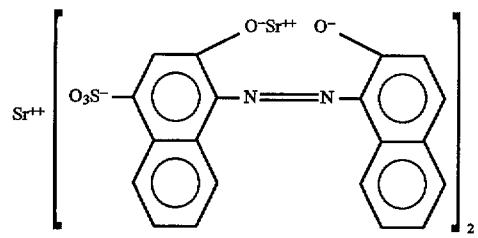

supported by zinc phosphate grains with a particle size of around 4 microns.

Comparative tests similar to those of Example 2 gave comparable results.

We claim:

1. A process for protecting a non-ferrous metallic material against corrosion comprising covering the metallic material with a coating containing at least one dihydroxyazoic salt having a solubility in water of between 0.01 g/l and 3 g/l, having the following structural unit:

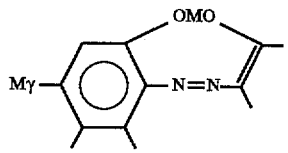

where γ is a salifiable anion and M a metal.

2. A process according to claim 1, wherein said dihydroxyazoic salt has a solubility of between 0.1 g/l and 1.5 g/l and γ is a sulphonate and M is a metal selected from the group consisting of zinc, tin, and alkaline earth metals.

3. A process according to claim 1, wherein said dihydroxyazoic salt has the following chemical formula:

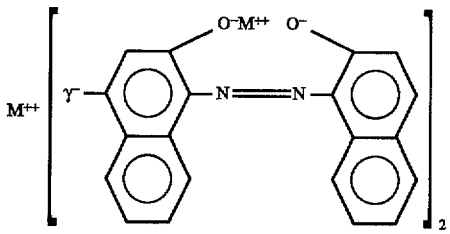

wherein γ is a salifiable anion and M a bivalent metal.

4. A process according to claim 1, wherein said dihydroxyazoic salt has a mean particle size of less than 7 microns.

5. A process according to claim 1, including mixing said dihydroxyazoic salt with a liquid binder.

6. A process according to claim 5, characterized in that said binder contains an insoluble mineral compound selected from the group consisting of zinc phosphate, zinc borate, talc and titanium oxide.

7. A process according to claim 5, in which between 5% and 30%, by weight, of said dihydroxyazoic salt is mixed with said binder.

8. A process according to claim 1, and wherein said metallic material comprises an alloy selected from the group consisting of aluminium/magnesium (type 5154), aluminium/magnesium/copper (type 2024) and aluminium/magnesium/zinc (type 7075) alloys.

9. A product for protecting non-ferrous metallic materials against corrosion, comprising a mixture of a binder and a corrosion inhibitor consisting of at least one dihydroxyazoic salt with a solubility in water of between 0.01 g/l and 3 g/l, having the following structural unit:

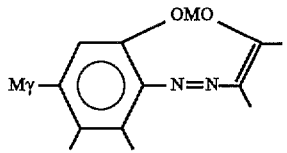

where γ is a salifiable anion, and M a bivalent metal, selected from the group consisting of zinc, tin and alkaline earth metals.

10. A product according to claim 9, in which γ is a sulphonate anion and M is zinc.

11. A product according to claim 9, and wherein the dihydroxyazoic salt is combined with grains of an insoluble mineral compound having a particle size of less than 7 microns.

12. A product according to claim 9, and wherein said dihydroxyazoic salt has the following formula:

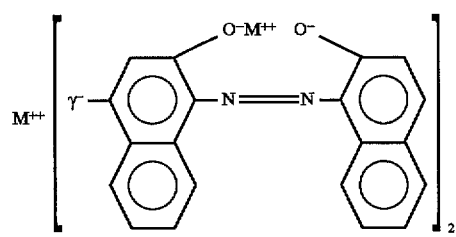

* * * * *